(12) United States Patent
Dobrev et al.

(10) Patent No.: US 10,057,377 B2
(45) Date of Patent: Aug. 21, 2018

(54) DYNAMIC RESOLUTION OF SERVERS IN A DISTRIBUTED ENVIRONMENT

(75) Inventors: Pavel Mitkov Dobrev, Sofia (BG); Kalin Georgiev Fetvadjiev, Sofia (BG)

(73) Assignee: VMware, Inc., Palo Alto, CA (US)

( * ) Notice: Subject to any disclaimer, the term of this patent is extended or adjusted under 35 U.S.C. 154(b) by 222 days.

(21) Appl. No.: 13/538,738

(22) Filed: Jun. 29, 2012

(65) Prior Publication Data

US 2014/0006480 A1    Jan. 2, 2014

(51) Int. Cl.
| H04L 29/08 | (2006.01) |
| G06F 9/50 | (2006.01) |
| G06F 9/455 | (2018.01) |
| H04L 29/06 | (2006.01) |

(52) U.S. Cl.
CPC .......... *H04L 67/42* (2013.01); *G06F 9/45533* (2013.01); *G06F 9/5027* (2013.01); *H04L 67/1002* (2013.01); *H04L 67/1027* (2013.01); *G06F 2209/5015* (2013.01)

(58) Field of Classification Search
CPC ............... G06F 9/5072; G06F 9/45533; H04L 67/1027; H04L 67/1002
USPC ........ 709/201, 203, 204, 205, 217, 219, 238
See application file for complete search history.

(56) References Cited

U.S. PATENT DOCUMENTS

| 6,789,077 | B1* | 9/2004 | Slaughter | ........... G06F 9/465 |
| 7,240,100 | B1* | 7/2007 | Wein | .............. H04L 67/1008 709/214 |
| 7,430,587 | B2* | 9/2008 | Malone | .............. G06F 17/3089 707/999.003 |
| 7,606,818 | B2* | 10/2009 | Bachmann | .............. G06F 9/542 |
| 7,877,511 | B1* | 1/2011 | Berger | .............. G06F 17/30067 709/201 |
| 7,958,093 | B2* | 6/2011 | Anderson | ............. G06F 3/0605 707/610 |
| 2003/0031176 | A1* | 2/2003 | Sim | ................... G06F 17/30194 370/392 |
| 2003/0115434 | A1* | 6/2003 | Mahalingam | ..... G06F 17/30067 711/165 |
| 2003/0154239 | A1* | 8/2003 | Davis | ................... H04L 63/0227 709/201 |
| 2005/0010653 | A1* | 1/2005 | McCanne | ............. H04L 69/329 709/219 |
| 2005/0172010 | A1* | 8/2005 | Malone | .............. G06F 17/3089 709/219 |
| 2007/0106536 | A1* | 5/2007 | Moore | ................. G06F 17/3089 705/3 |

(Continued)

OTHER PUBLICATIONS

Han et al., "Meta Web Service based Distributed Model Management and Composition Approach", Intelligent Systems and Knowledge Engineering (ISKE), Nov. 15, 2010, p. 117-122, ISBN 978-1-4244-6791-4, IEEE.*

*Primary Examiner* — Edward Kim

(57) ABSTRACT

The present application is directed to methods and systems that provide for identification of a server, within a distributed computing environment, through which an object can be accessed. The object is associated with metadata that identifies a server currently responsible for providing access to the object. By these methods and system, a request to access an object can be directed to an appropriate server, without first accessing a centralized dispatching node and without access to detailed mappings of access-type/object pairs to servers in a distributed computing environment.

8 Claims, 18 Drawing Sheets

(56) References Cited

U.S. PATENT DOCUMENTS

| | | | | |
|---|---|---|---|---|
| 2008/0155038 A1* | 6/2008 | Bachmann | .............. | G06F 9/542 709/206 |
| 2008/0172445 A1* | 7/2008 | Zaidelson | .............. | G06Q 10/10 709/201 |
| 2009/0276771 A1* | 11/2009 | Nickolov | .............. | G06F 9/4856 717/177 |
| 2009/0299937 A1* | 12/2009 | Lazovsky | ......... | H04L 29/12113 706/47 |
| 2010/0146045 A1* | 6/2010 | Moore | .................... | H04L 29/06 709/203 |
| 2011/0125835 A1* | 5/2011 | Soltis | ................ | G06F 17/30194 709/203 |
| 2011/0258634 A1* | 10/2011 | Bonilla | .................... | G06F 9/505 718/105 |
| 2011/0282835 A1* | 11/2011 | Cannon | ............. | G06F 17/30079 707/622 |
| 2013/0019282 A1* | 1/2013 | Rice | ........................ | H04L 67/16 726/4 |

* cited by examiner

DYNAMIC RESOLUTION OF SERVERS IN A DISTRIBUTED ENVIRONMENT

TECHNICAL FIELD

The present patent application is directed to distributed computing, including virtual-machine-based distributed computing and, in particular, to methods and system for providing identification of the current server in a distributed computing environment responsible for providing a particular type of access to an object.

BACKGROUND

The development and evolution of modern computing has, in many ways, been facilitated by the power of logical abstraction. Early computers were manually programmed by slow and tedious input of machine instructions into the computers' memories. Over time, assembly-language programs and assemblers were developed in order to provide a level of abstraction, namely assembly-language programs, above the machine-instruction hardware-interface level, to allow programmers to more rapidly and accurately develop programs. Assembly-language-based operations are more easily encoded by human programmers than machine-instruction-based operations, and assemblers provided additional features, including assembly directives, routine calls, and a logical framework for program development. The development of operating systems provided yet another type of abstraction that provided programmers with logical, easy-to-understand system-call interfaces to computer-hardware functionality. As operating systems developed, additional internal levels of abstraction were created within operating systems, including virtual memory, implemented by operating-system paging of memory pages between electronic memory and mass-storage devices, which provided easy-to-use, linear memory-address spaces much larger than could be provided by the hardware memory of computer systems. Additional levels of abstractions were created in the programming-language domain, with compilers developed for a wide variety of compiled languages that greatly advanced the ease of programming and the number and capabilities of programming tools with respect those provided by assemblers and assembly languages. Higher-level scripting languages and special-purpose interpreted languages provided even higher levels of abstraction and greater ease of application development in particular areas. Similarly, block-based and sector-based interfaces to mass-storage devices have been abstracted through many levels of abstraction to modern database management systems, which provide for high-available and fault-tolerant storage of structured data that can be analyzed, interpreted, and manipulated through powerful high-level query languages.

In many ways, a modern computer system can be thought of as many different levels of abstractions along many different, often interdependent, dimensions. More recently, powerful new levels of abstraction have been developed with respect to virtual machines, which provide virtual execution environments for application programs and operating systems. Virtual-machine technology essentially abstracts the hardware resources and interfaces of a computer system on behalf of multiple virtual machines, each comprising one or more application programs and an operating system. Even more recently, the emergence of cloud computing services can provide abstract interfaces to enormous collections of geographically dispersed data centers, allowing computational service providers to develop and deploy complex Internet-based services that execute on tens or hundreds of physical servers through abstract cloud-computing interfaces.

While levels of abstraction within computational facilities are generally intended to be well organized and are often hierarchically structured, with dependencies and interconnections generally constrained to adjacent levels in the various hierarchies, practically, there are often many interdependencies that span multiple hierarchical levels and that pose difficult design and implementation issues. As levels of abstraction continue to be added to produce new and useful computational interfaces, such as cloud-computing-services interfaces, designers, developers, and users of computational tools continue to seek implementation methods and strategies to efficiently and logically support additional levels of abstraction.

SUMMARY

The present application is directed to methods and systems that provide for identification of a server, within a distributed computing environment, through which an object can be accessed. The object is associated with metadata that identifies a server currently responsible for providing access to the object. By these methods and system, a request to access an object can be directed to an appropriate server, without first accessing a centralized dispatching node and without access to detailed mappings of access-type/object pairs to servers in a distributed computing environment.

DETAILED DESCRIPTION

Figure 1:
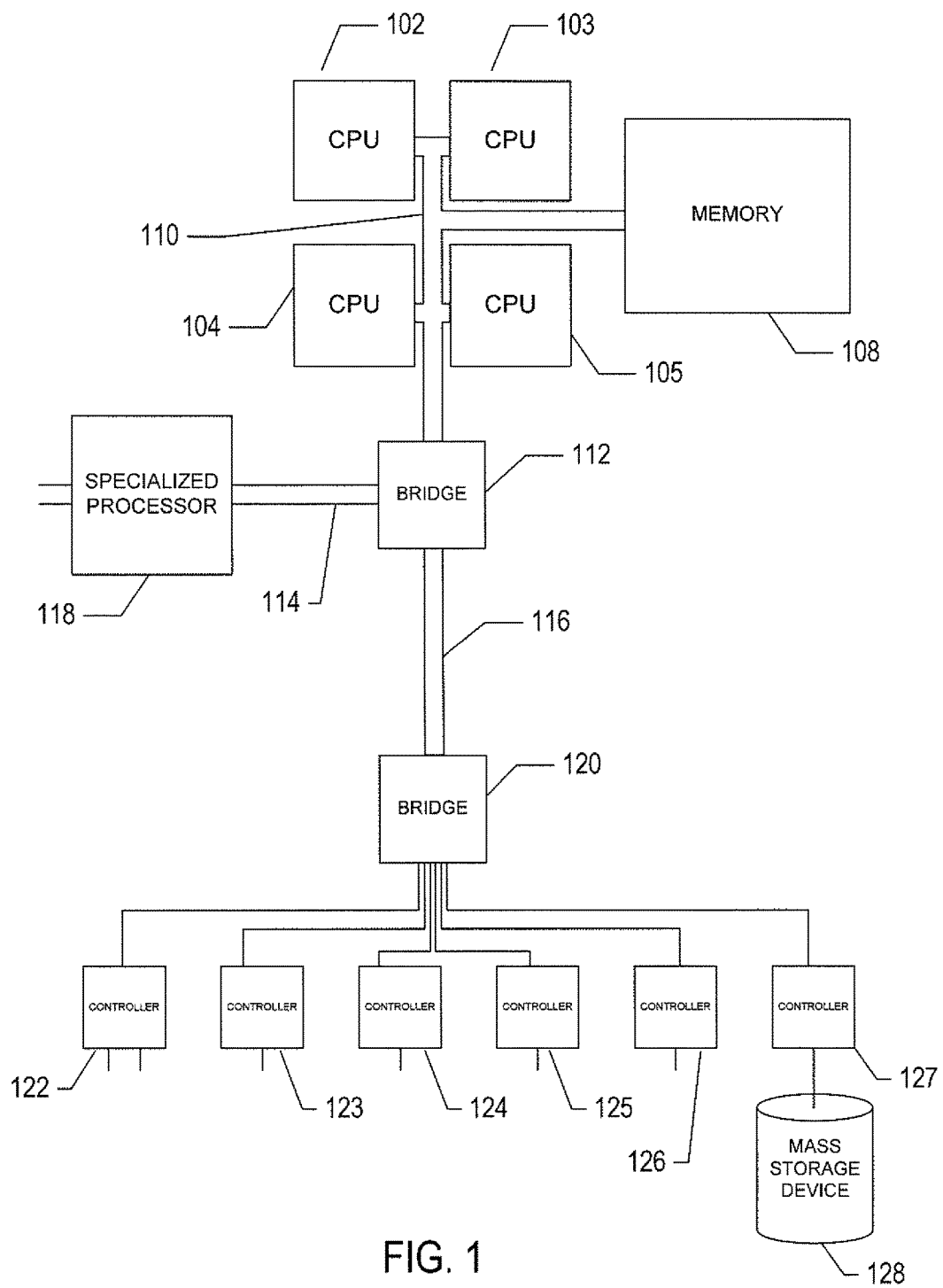
FIG. 1 provides a general architectural diagram for various types of computers.

As discussed above, modem computing can be considered to be a collection of many different levels of abstraction above the computing-hardware level that includes physical computer systems, data-storage systems and devices, and communications networks. The present application is related to a multi-cloud-aggregation level of abstraction that provides homogenous-cloud and heterogeneous-cloud distributed management services, each cloud generally an abstraction of a large number of virtual resource pools comprising processing, storage, and network resources, each of which, in turn, can be considered to be a collection of abstractions above underlying physical hardware devices.

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modem technology and science to misinterpret the terms "abstract" and "abstraction" when used to describe certain aspects of modem computing. For example, one frequently encounters allegations that because a computational system is described in terms of abstractions, functional layers, and interfaces, that it is somehow different from a physical machine or device. Such allegations are unfounded. One only needs to disconnect a computer system or group of computer systems from their respective power supplies to appreciate the physical, machine nature of complex computer technologies. One also frequently encounters statements made by those unfamiliar with modern technology and science that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential control component of processor-controlled machines and devices, no less essential than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
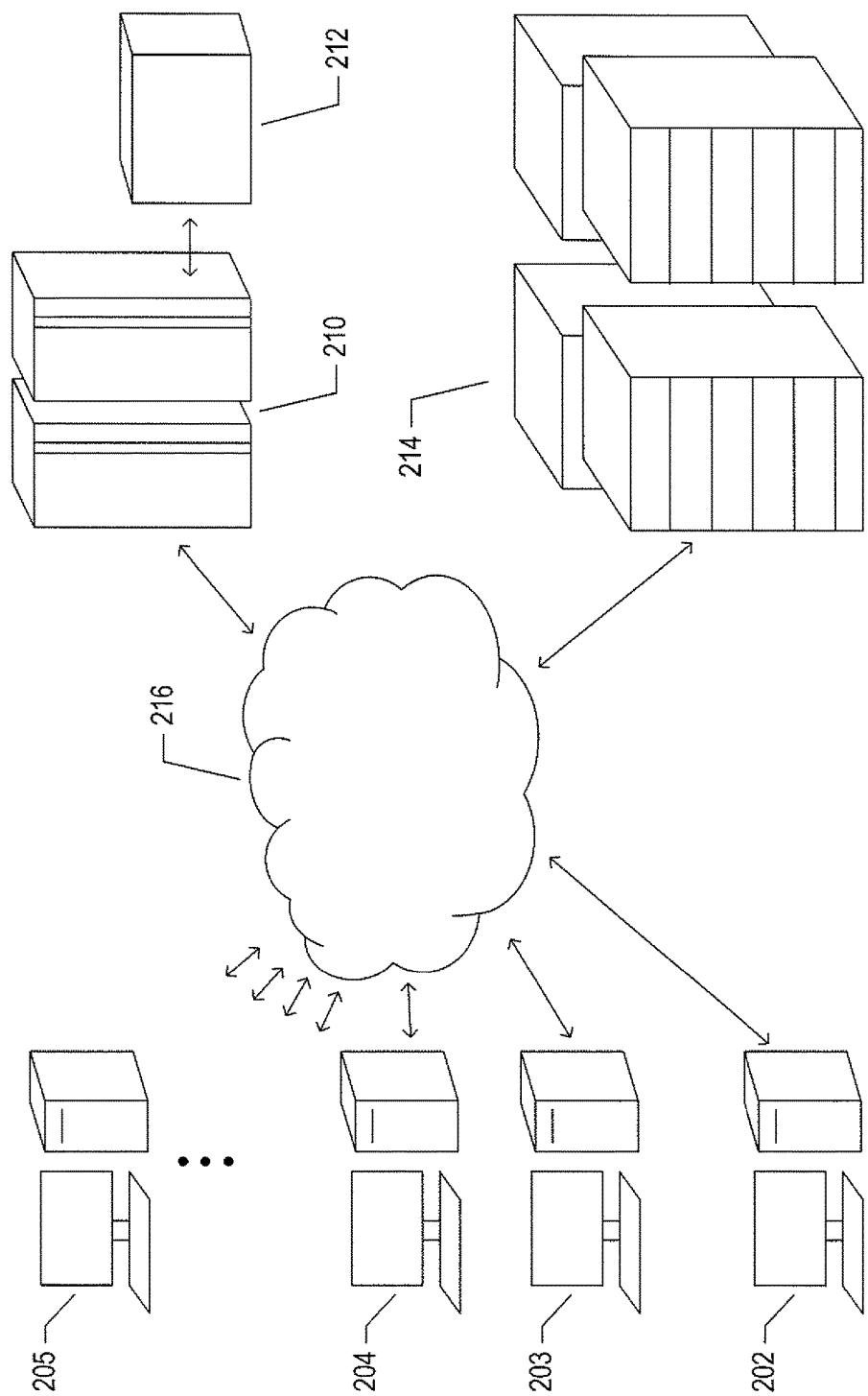
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
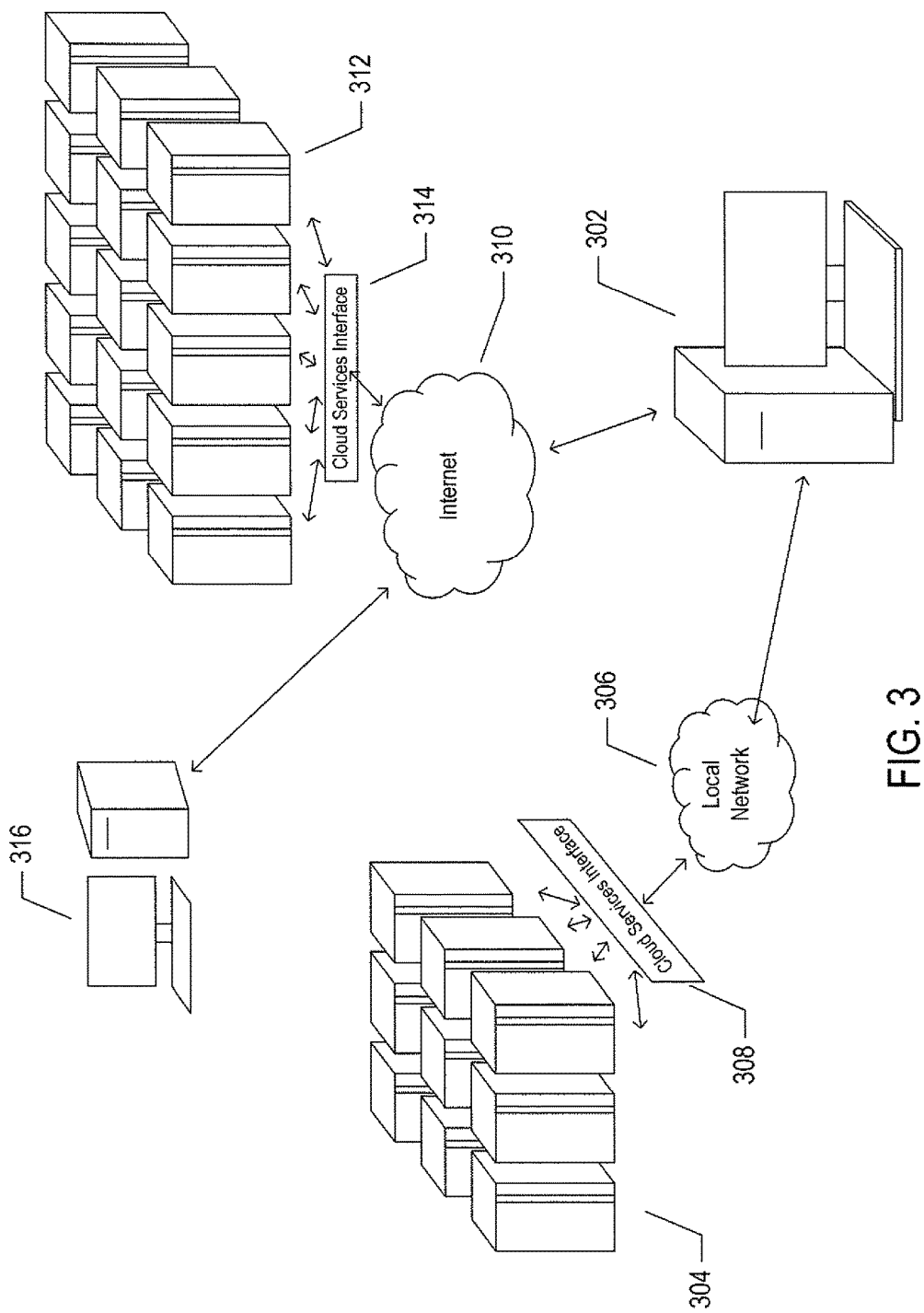
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
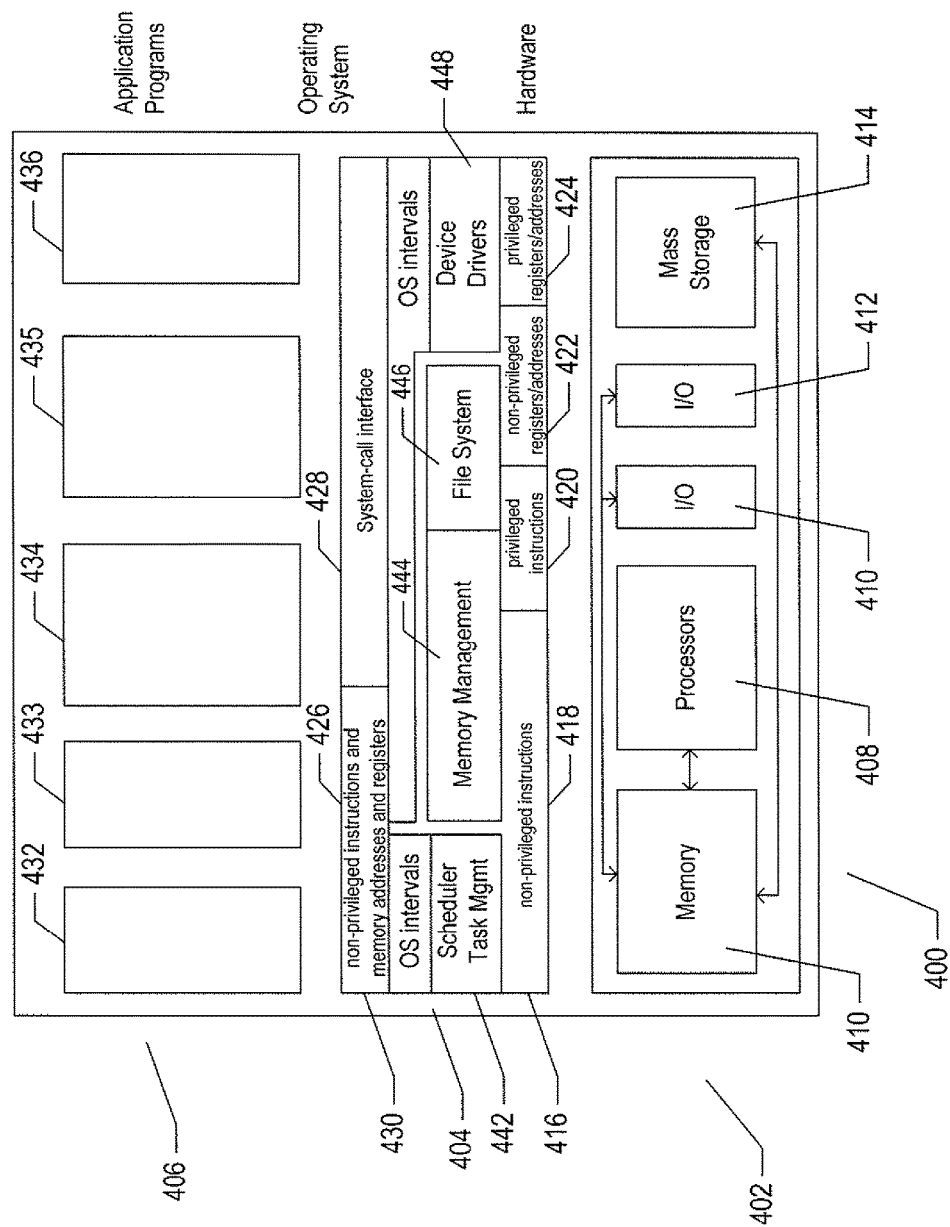
FIG. 4 illustrates generalized hardware and software components of a general-purpose compute system, such as a general-purpose computer system having an architecture similar to that shown in FIG. 1.

FIG. 4 illustrates generalized hardware and software components of a general-purpose compute system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5:
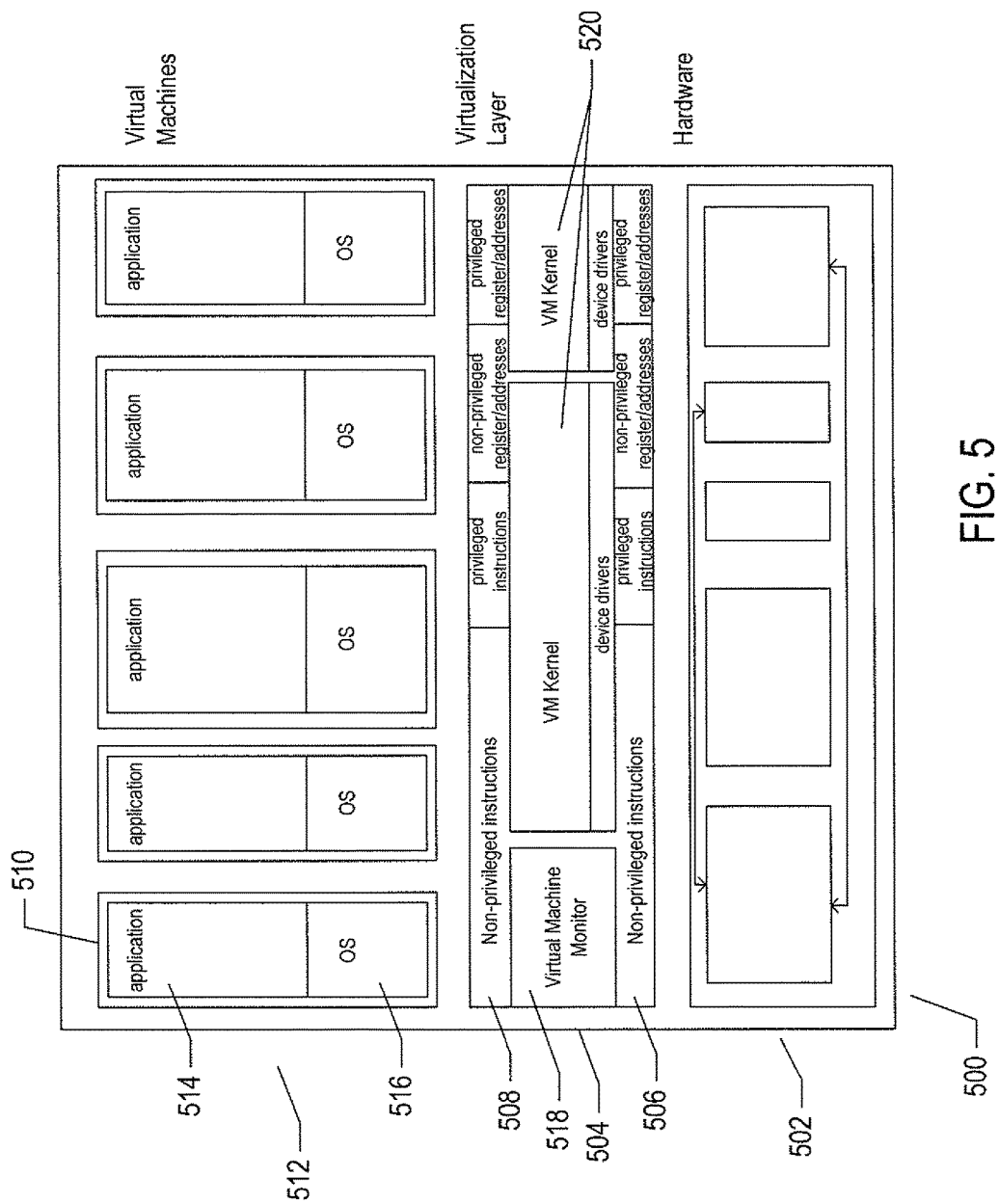
FIG. 5 illustrates one type of virtual machine and virtual-machine execution environment.

For all of these reasons, a higher level of abstraction, referred to as the "virtual machine," has been developed and evolved to further abstract computer hardware in order to address many difficulties and challenges associated with traditional computing systems, including the compatibility issues discussed above. FIG. 5 illustrates one type of virtual machine and virtual-machine execution environment. FIG. 5 uses the same illustration conventions as used in FIG. 4. In particular, the computer system 500 in FIG. 5 includes the same hardware layer 502 as the hardware layer 402 shown in FIG. 4. However, rather than providing an operating system layer directly above the hardware layer, as in FIG. 4, the virtualized computing environment illustrated in FIG. 5 features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, such as application 514 and operating system 516 packaged together within virtual machine 510. Each virtual machine is thus equivalent to the operating-system layer 404 and application-program layer 406 in the general-purpose computer system shown in FIG. 4. Each operating system within a virtual machine interfaces to the virtualization-layer interface 508 rather than to the actual hardware interface 506. The virtualization layer partitions hardware resources into abstract virtual-hardware layers to which each operating system within a virtual machine interfaces. The operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different operating systems. For example, the virtualization layer is generally able to provide virtual hardware interfaces for a variety of different types of computer hardware. This allows, as one example, a virtual machine that includes an operating system designed for a particular computer architecture to run on hardware of a different architecture. The number of virtual machines need not be equal to the number of physical processors or even a multiple of the number of processors. The virtualization layer includes a virtual-machine-monitor module 518 that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines. The kernel, for example, maintains shadow page tables on each virtual machine so that hardware-level virtual-memory facilities can be used to process memory accesses. The kernel additionally includes routines that implement virtual communications and data-storage devices as well as device drivers that directly control the operation of underlying hardware communications and data-storage devices. Similarly, the kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

Figure 6:
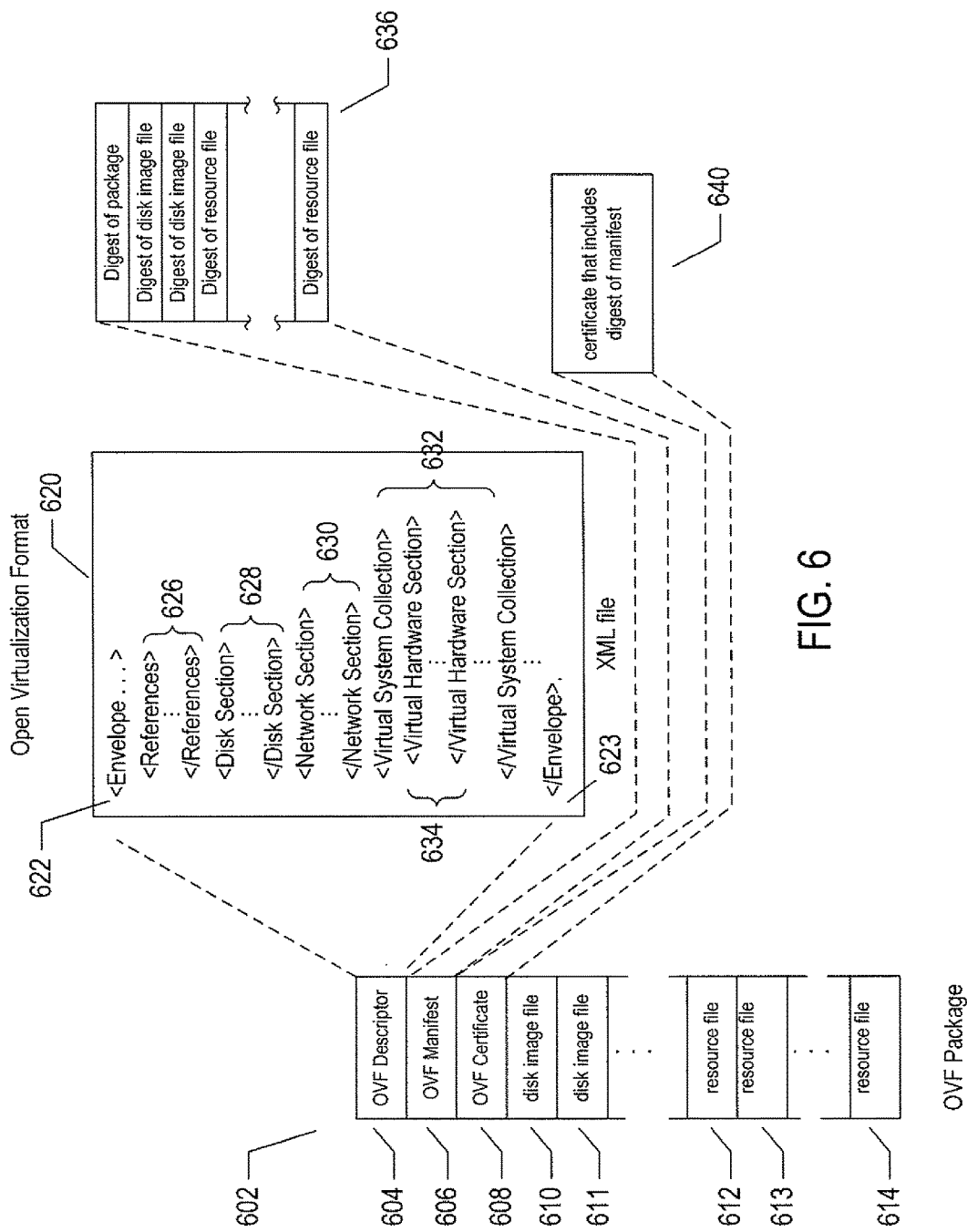
FIG. 6 illustrates an OVF package.

A virtual machine is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
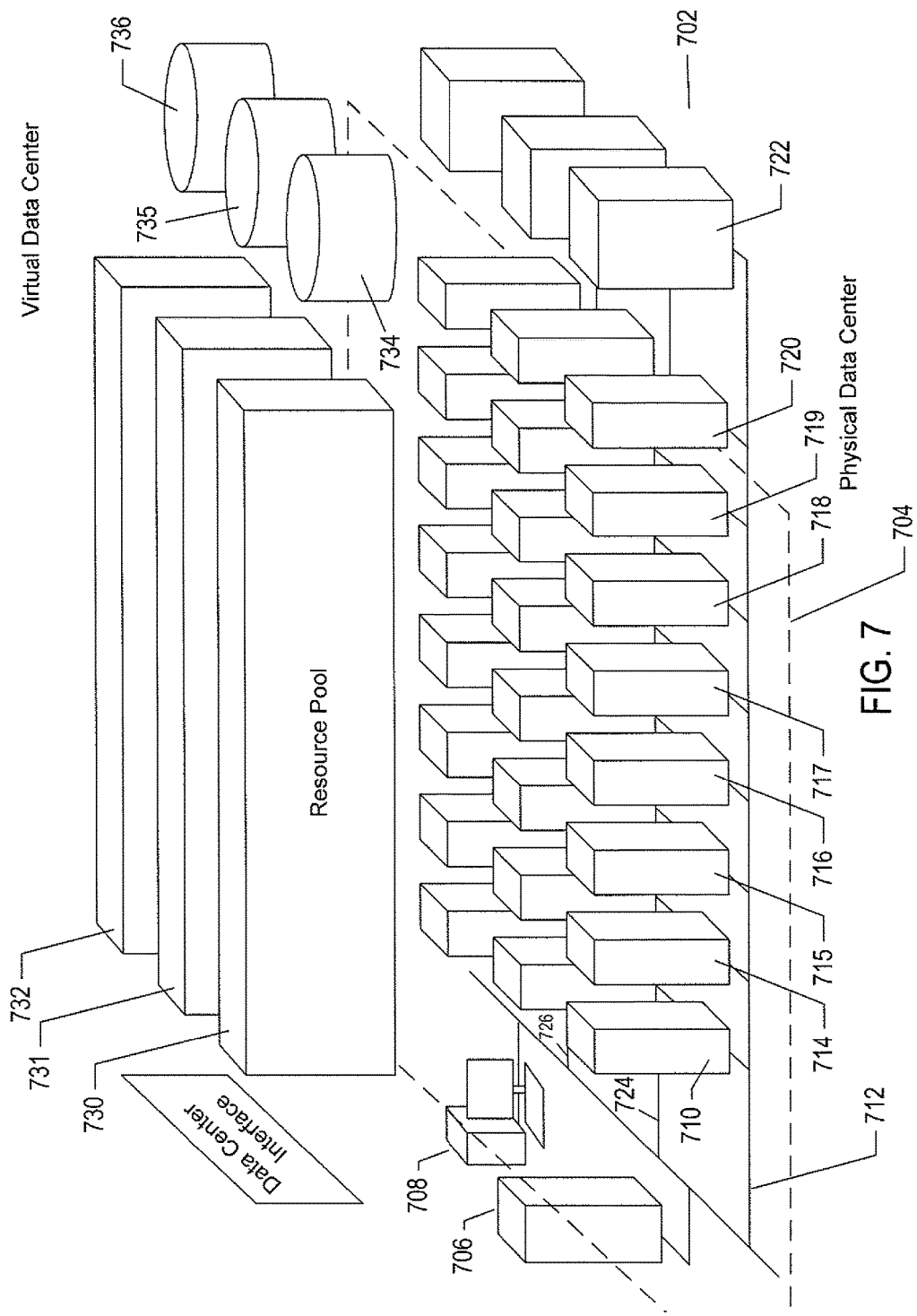
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the virtual-data-center management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
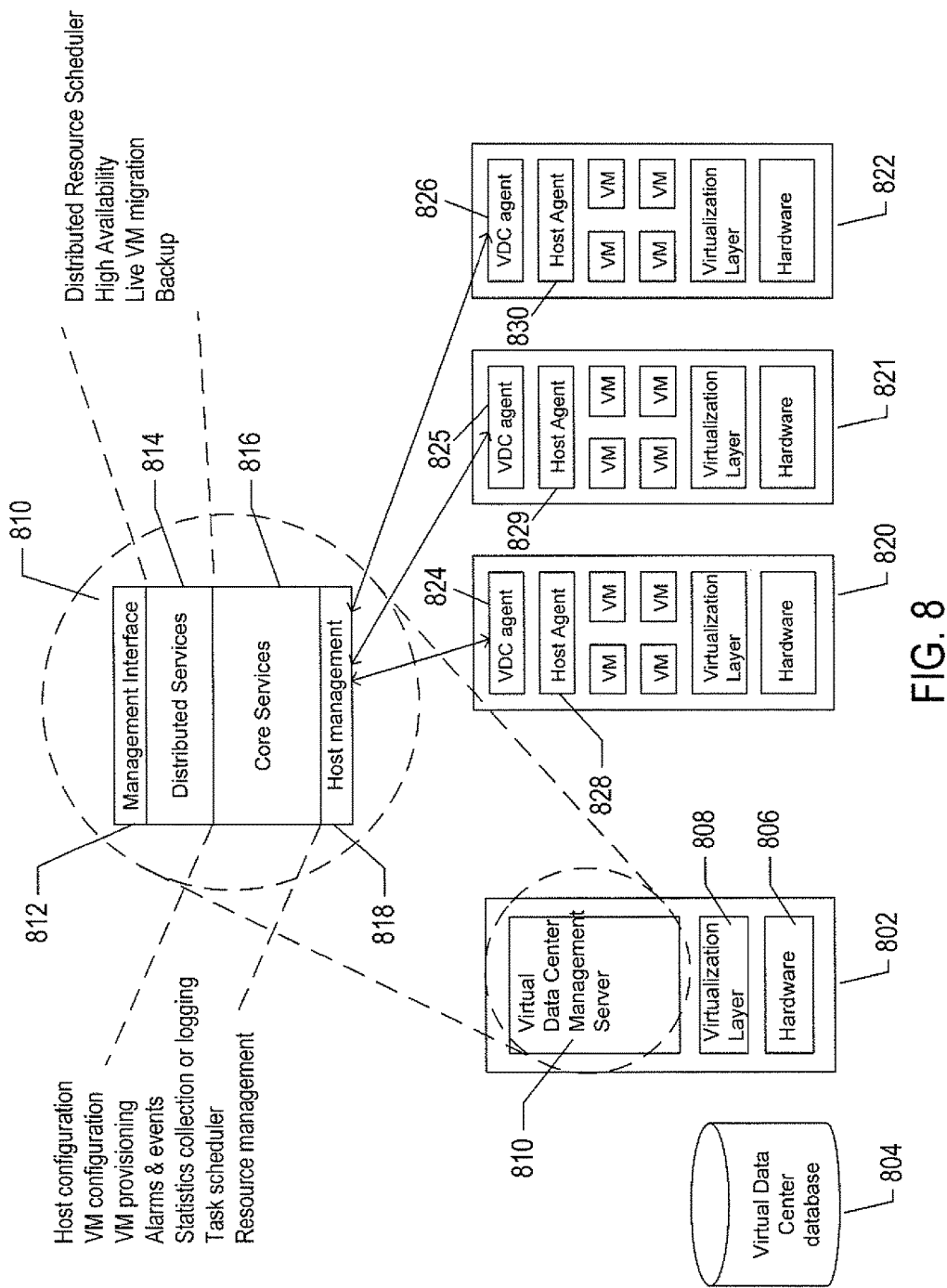
FIG. 8 illustrates virtual-machine components of a virtual-data-center management server and physical servers of a physical data center above which a virtual-data-center interface is provided by the virtual-data-center management server.

FIG. 8 illustrates virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server virtual machine 810 above the virtualization layer. Although shown as a single server in FIG. 8, the virtual-data-center management server ("VDC management server") may include two or more physical server computers that support multiple VDC-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VDC management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VDC management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
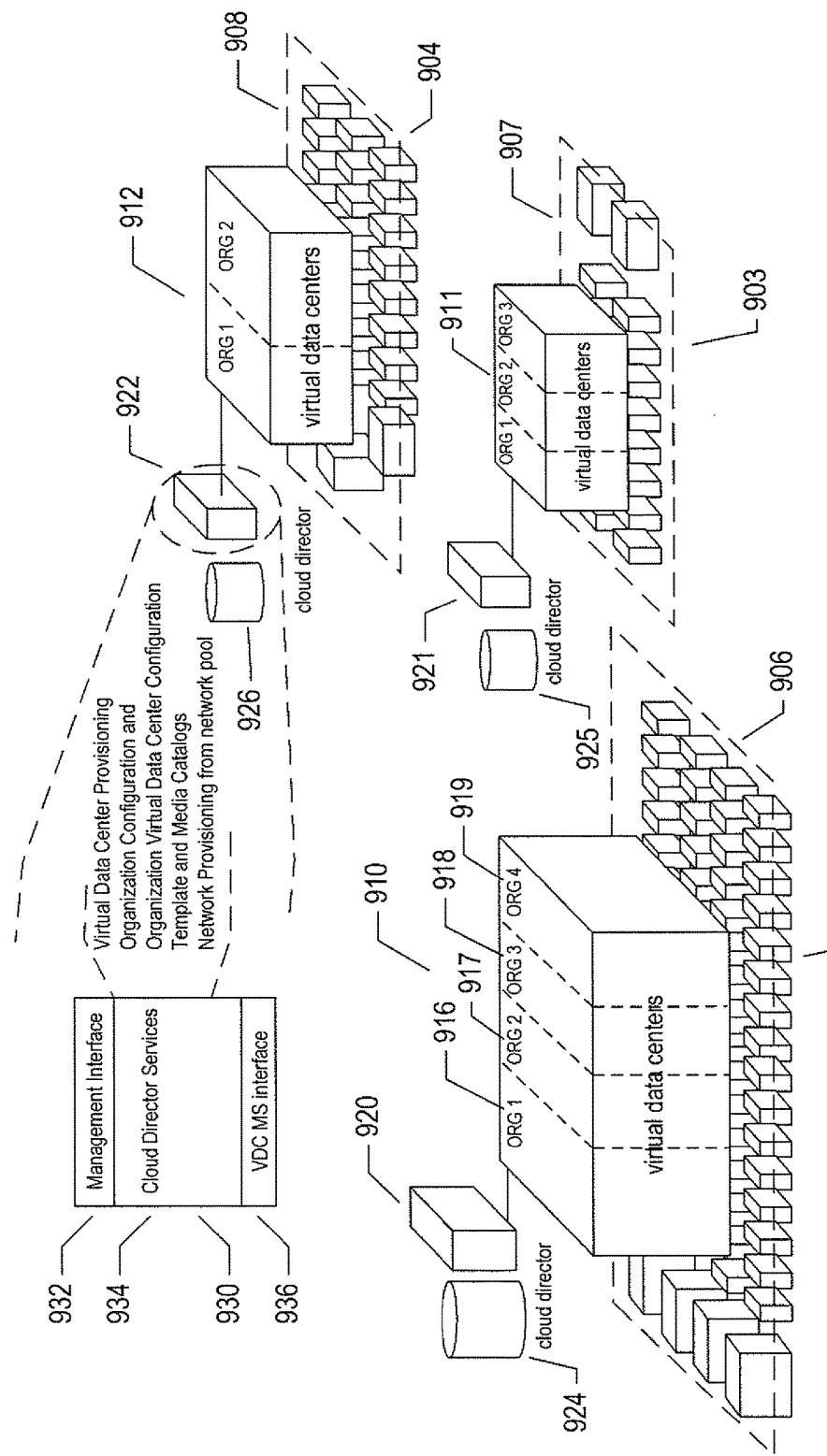
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud direct or comprising one or more cloud-director servers 920-922 and associated cloud-director databases 924-926. Each cloud-director server or servers runs a cloud-director virtual appliance 930 that includes a cloud-direct or management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A vAPP template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Figure 10A:
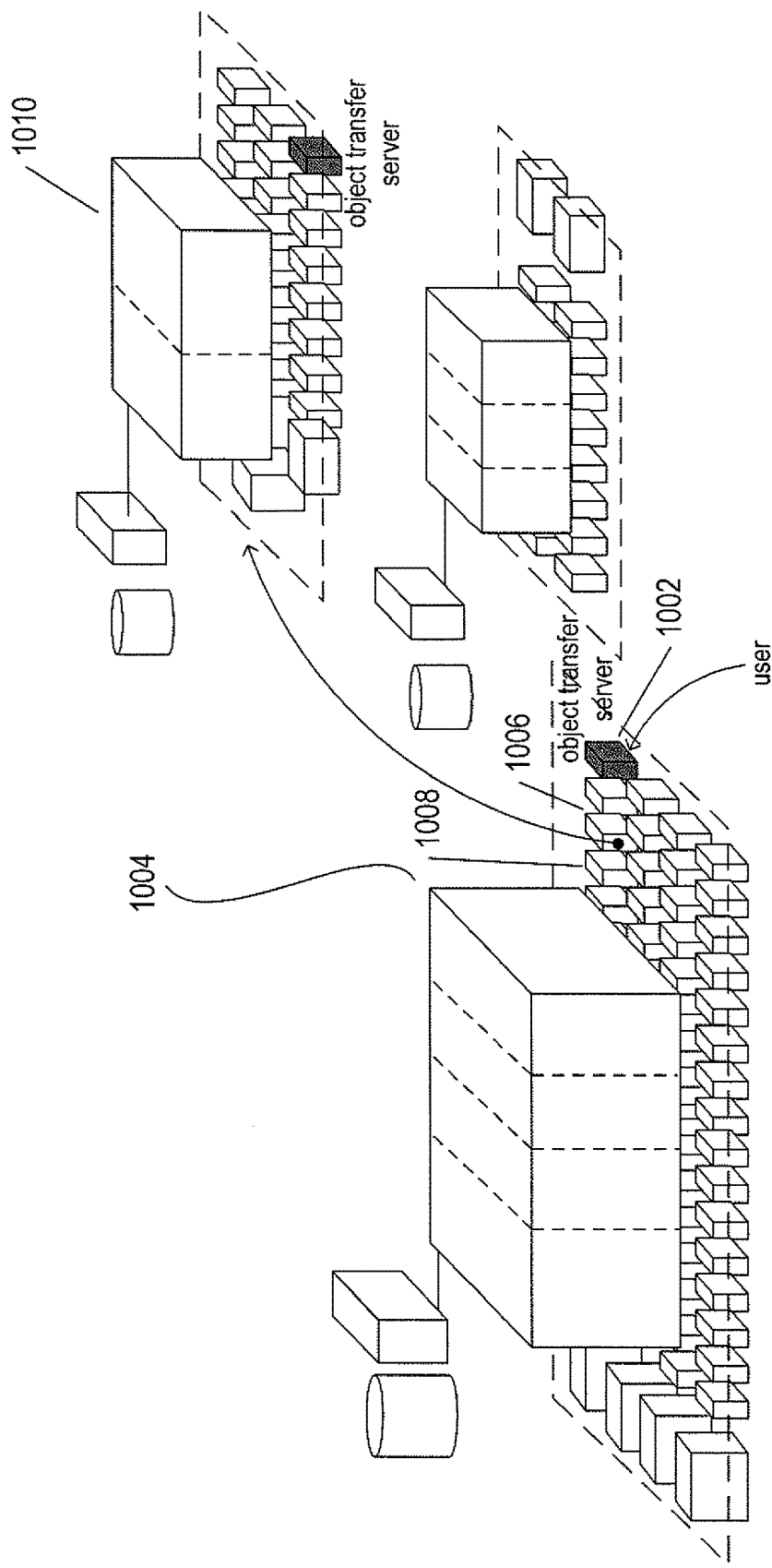
FIGS. 10A-D illustrate an object-transfer function that allows various types of objects, such as virtual applications, to be transferred from one virtual data center to another.

FIGS. 10A-D illustrate an object-transfer function that allows various types of objects, such as vAPPs, to be transferred from one virtual data center to another. The inter-virtual-data-center object-transfer service, discussed with reference to FIGS. 10A-E, provides an example scenario in which the currently disclosed methods facilitate inter-virtual-data-center computational operations. The currently disclosed methods can be used for facilitating any of many different types of operations carried out between any of many different types of distributed computational systems. In FIG. 10A, a user initiates an object-transfer operation by contacting the object-transfer server 1002 within a virtual data center 1004 accessible to the user, referred to as the "local virtual data center." The user requests the object-transfer server 1002, generally through an object-transfer-service interface, to transfer an object, such as a vApp 1006, from a virtual-data-center server 1008 to a different, second virtual data center 1010, referred to below as the "remote virtual data center."

Figure 10B:
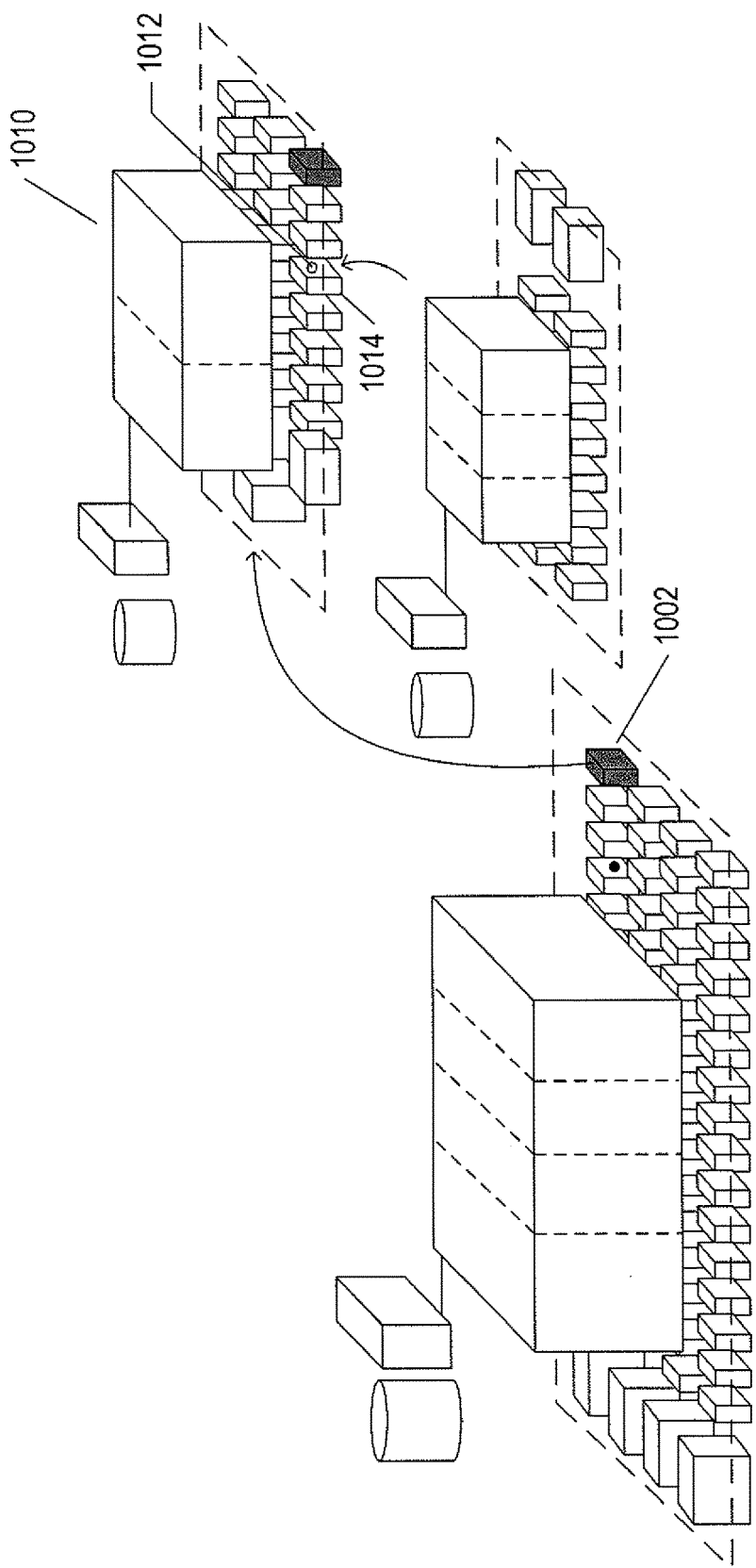

As shown in FIG. 10B, the object-transfer server 1002 to which the user directed the request for object transfer carries out the object transfer by first provisioning a placeholder object1012 within a server 1014 associated with the remote virtual data center 1010 by accessing a remote object-provisioning service provided by an object-transfer server in the remote virtual data center. Then, as shown in FIG. 10C, the object-transfer server 1002 in the local virtual data center 1004 transmits a direct request to the object-transfer server 1016 associated with the remote virtual data center 1010 to carry out transfer of the contents of object 1006 to the newly provisioned object placeholder object (1012 in FIG. 10B) to create a fully functional, transferred object 1020 within a server associated with the remote virtual data center 1010.

Figure 10C:
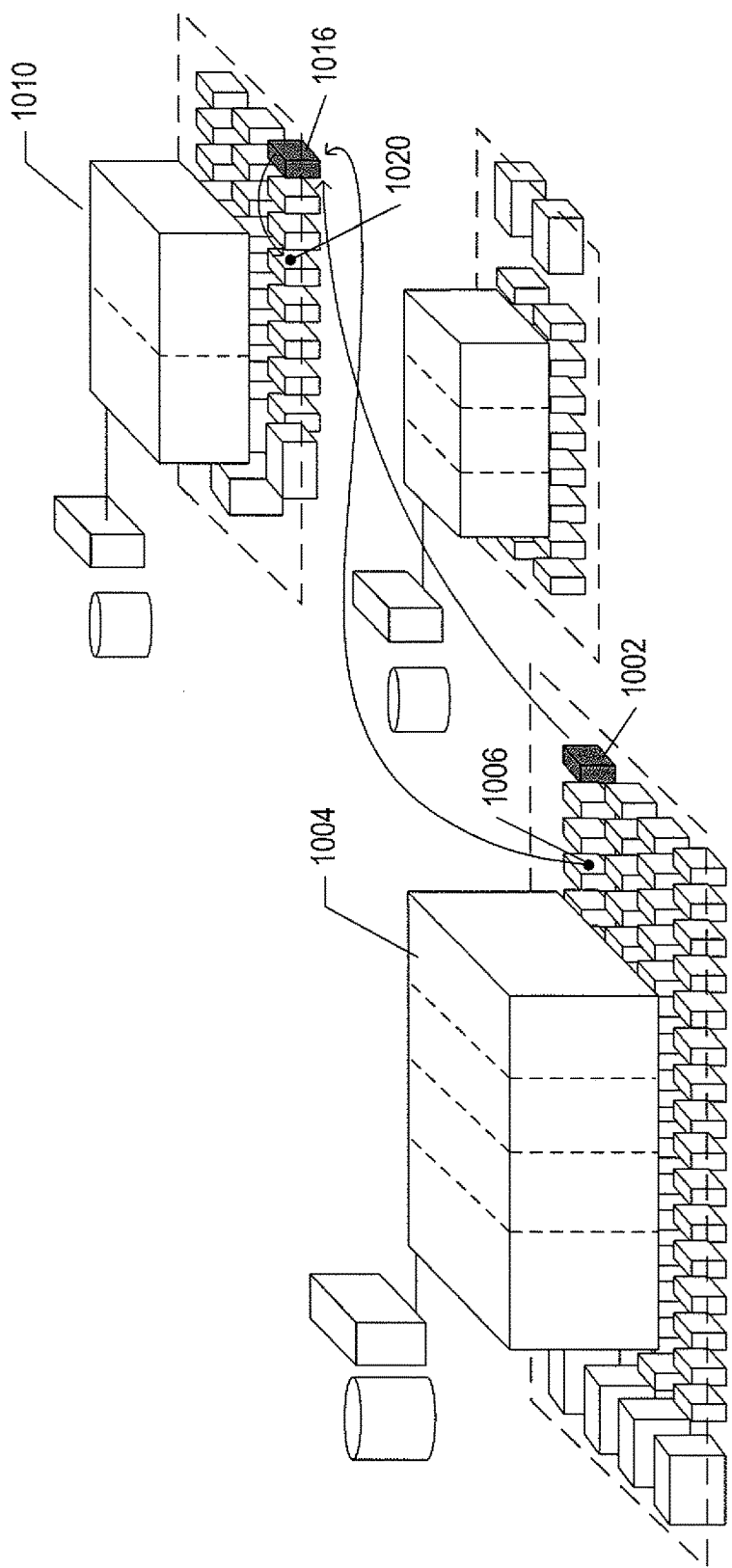

The step, illustrated in FIG. 10C, in which the local object-transfer server 1002 contacts the remote object-transfer server 1016 in the remote virtual data center 1010 involves the local object-transfer server 1002 identifying the remote object-transfer server 1016 in order to send an object-transfer request to the remote object-transfer server. In general, servers and other computational entities in a given virtual data center are ignorant of the configuration and assignment of computational tasks to servers in a different, remote virtual data center. There are many good reasons for not exposing such configuration details of a first distributed computing facility to remote distributed computing facilities. First, the configuration and assignment of servers to serving particular types of requests and tasks may be extremely dynamic, within a distributed computing environment. As a result, any attempt to expose configuration details involves potentially difficult, distributed-computing challenges related to maintaining a current, accurate snapshot of configuration details and server assignments accessible to remote computational entities. However, even when possible, there may be many reasons, including security reasons, for which a distributed computing facility may not wish to expose configuration details and server assignments to remote entities. Instead, distributed computing facilities generally prefer that all service requests be directed to one or more distributed-computing-facility interfaces that abstract underlying details of the distributed-computing facility.

Figure 10D:
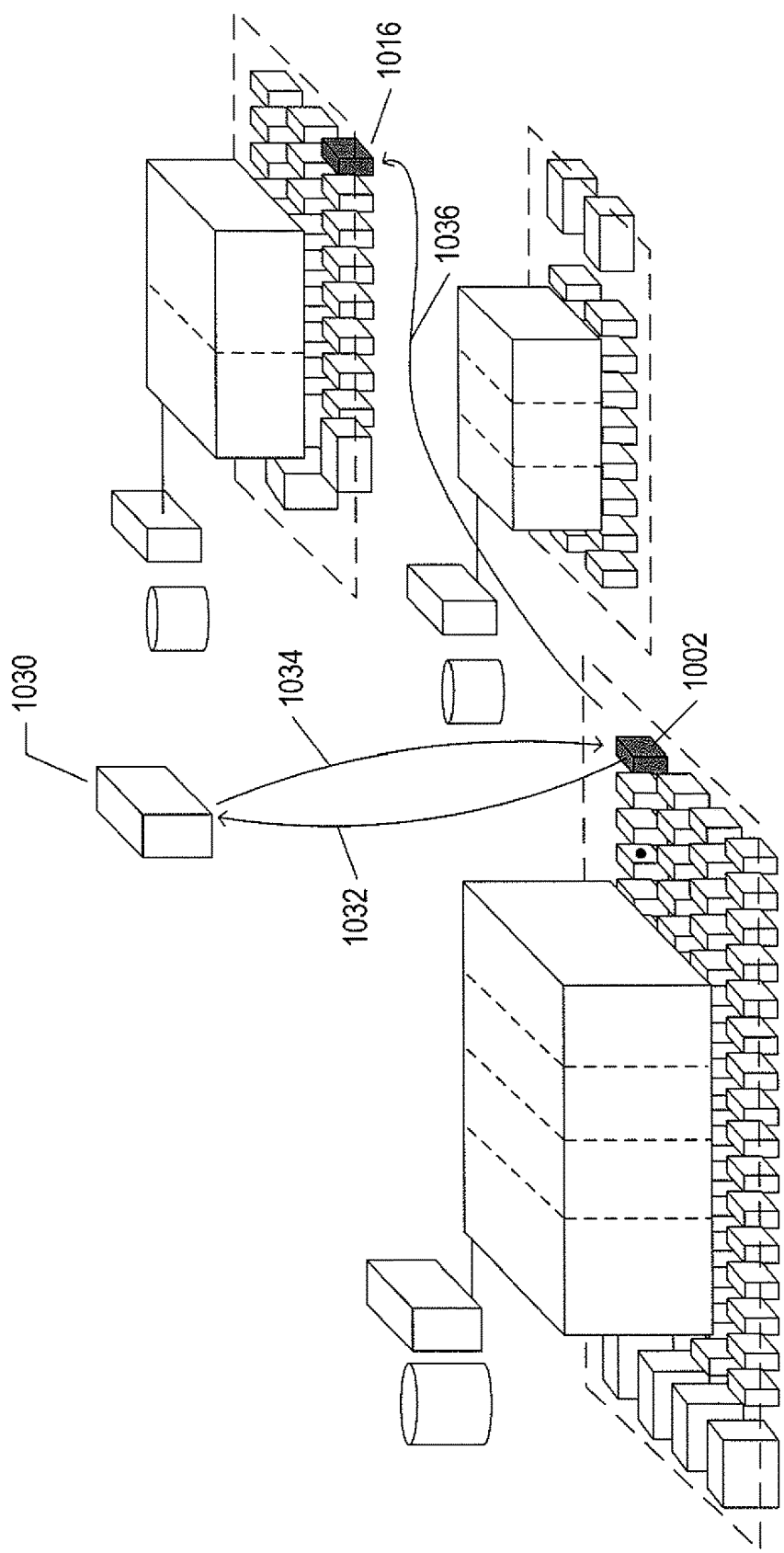

FIG. 10D illustrates one solution to the challenge of identifying, by the local object-transfer server, the remote object-transfer server to access in order to complete an object transfer. In this solution, a centralized service-request-resolution entity 1030 is provided to identify, on behalf of requesting computational entities, a server or other computational entity in a remote distributed computing environment that can receive and process a particular type of request directed to the remote distributed computing facility. Thus, the local object-transfer server 1002 sends a request 1032 to the centralized service-request resolver 1030 indicating the type of request that the local object-transfer server 1002 wishes to make and the remote distributed-computing facility to which the object-transfer server wishes to direct the request. The service-request resolution entity 1030 returns 1034 an address or other information identifying a computational entity, such as the remote object-transfer server 1016, in the target distributed-computing facility to which the object-transfer server 1002 can direct the request 1036.

The centralized service-request resolver 1030 is associated with many distributed-computing challenges and deficiencies. First, it represents a centralized, critical point of failure. Were the centralized service-request resolution entity 1030 to fail, then the object-transfer server 1002 would have no way of accessing complementary object-transfer servers in remote distributed-computing facilities. Furthermore, as discussed above, maintaining current request-resolution information in the service-request resolution entity presents a challenging distributing-computing problem that may involve significant computational overhead and even significant changes to existing distributed-computing facilities.

Figure 10E:
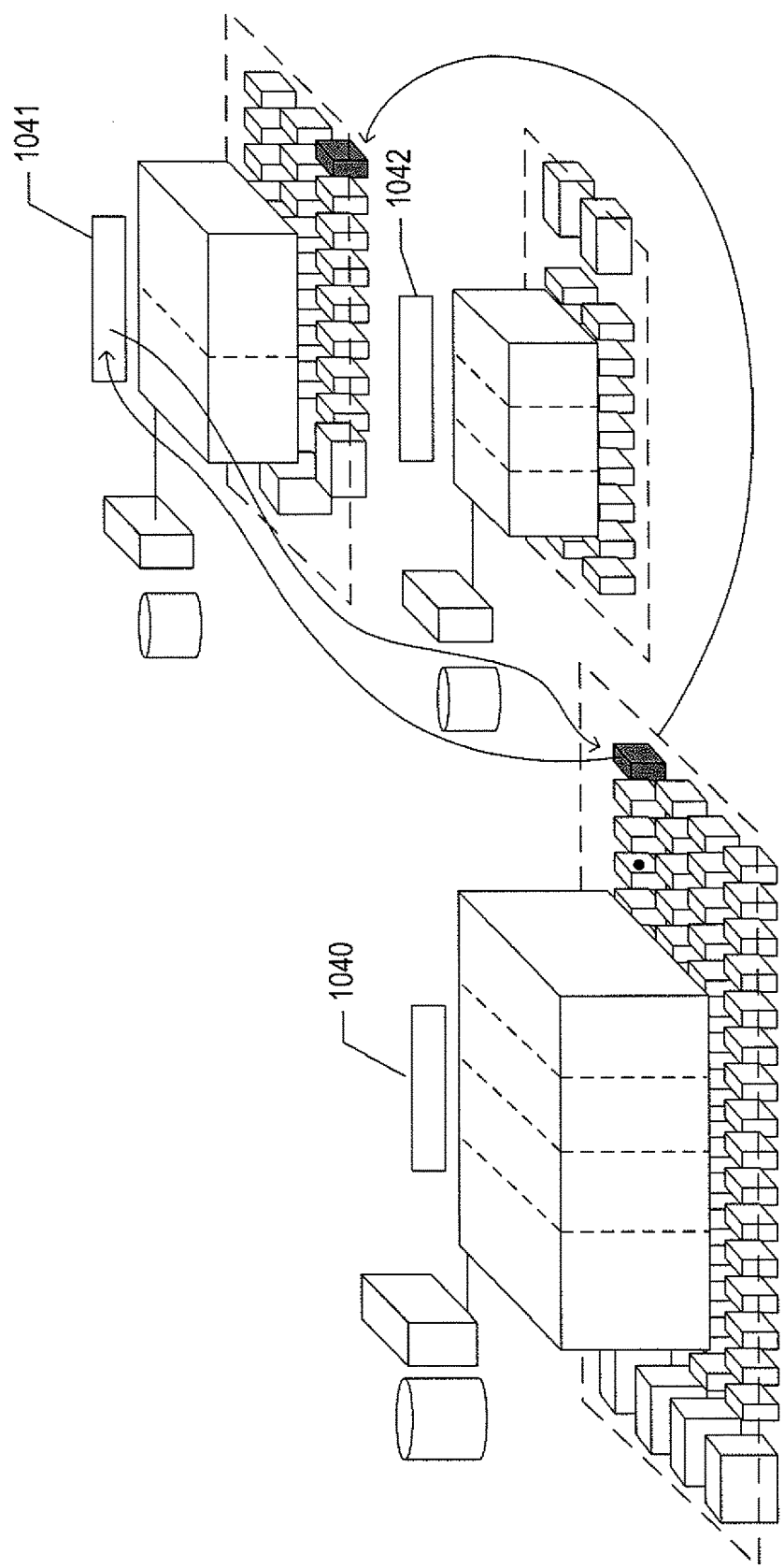
FIG. 10E illustrates a second approach to determining computational entities within remote distributed-computing facilities to which to direct requests.

FIG. 10E illustrates a second approach to determining computational entities within remote distributed-computing facilities to which to direct requests. Each distributed-computing facility maintains a request resolving interface 1040-1042 that provides an address or other information to requesting remote computational entities to allow the remote computational entities to send requests to a server or other computational entity within the distributed computing facility capable of handling the request. In this fashion, each distributed computing facility essentially provides a local service-request resolution entity. As with the centralized service-request resolution entity discussed above with reference to FIG. 10D, adding even a local service-request resolution interface may involve difficult distributed-computing challenges, significant computational overhead, and may nonetheless represent a type of local single-point of failure, in addition to exposing of internal configuration details and service assignments that are desirable to not be exposed to remote computational entities.

Figure 11:
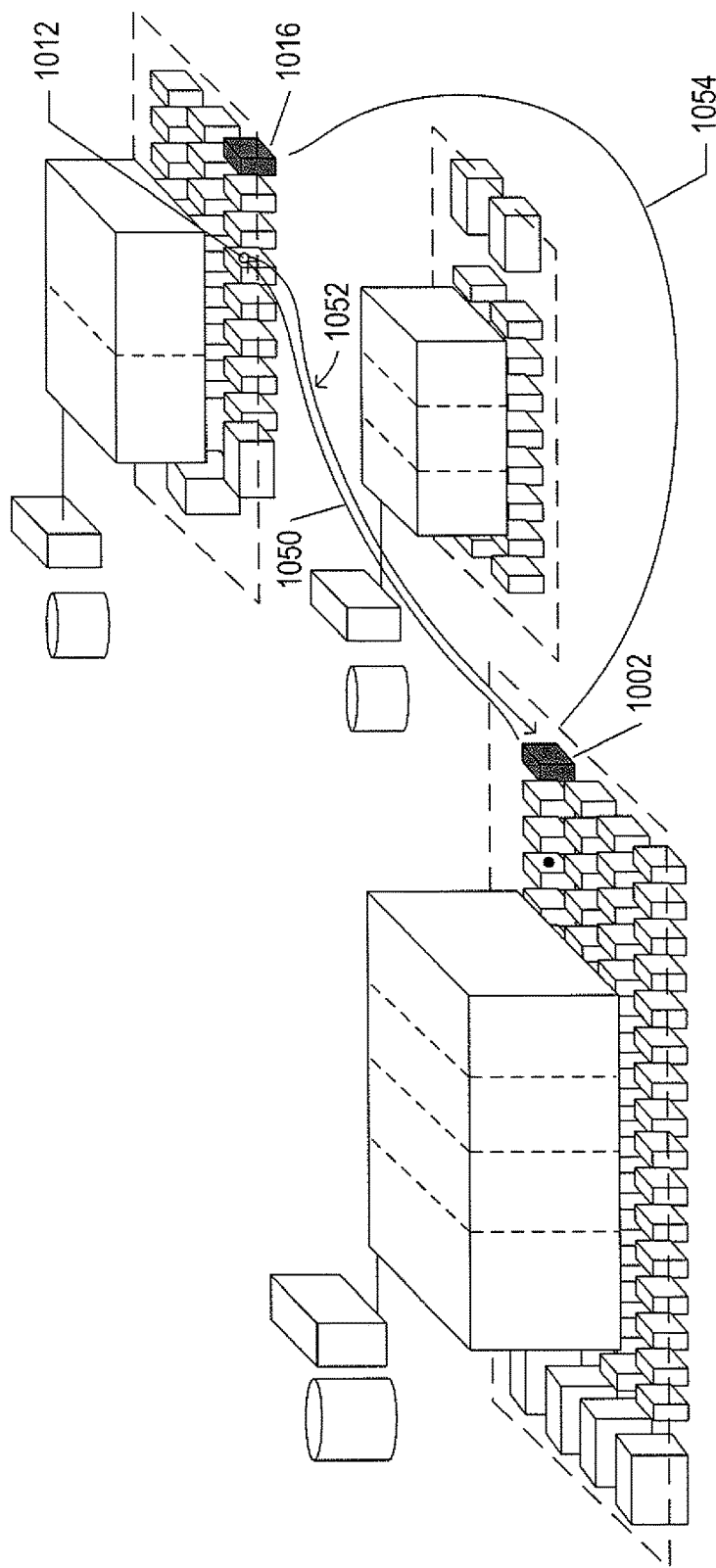
FIG. 11 illustrates an alternative method disclosed in the current application.

The current application is directed to an alternative method and to systems embodying the method to allow remote computational entities to direct requests to appropriate computational entities within a distributed-computing environment. FIG. 11 illustrates the alternative method disclosed in the current application. FIG. 11 follows the scenario illustrated in FIG. 10D. According to the current application, once the placeholder object 1012 has been created by the object-transfer server 1002, the object-transfer server can access the placeholder object 1012 through standard interfaces provided by the remote virtual data center to retrieve metadata stored within, or associated with, the placeholder object. This metadata provides an address or other information identifying a remote computational entity to which various types of requests associated with, or directed to, the object can be transmitted. Thus, once the placeholder object has been created, the object-transfer server 1002 accesses the placeholder object 1050 to retrieve an address or other identifying information 1052 that allows the object-transfer server 1002 to send the final transfer request 1054 to the object-transfer server 1016 within the remote distributed-computing facility. In other words, according to the current disclosure, a given object, such as a virtual application, other type of executable, or even various types of stored data, is annotated within a distributed computing system with information needed to request services related to the object.

Figure 12:
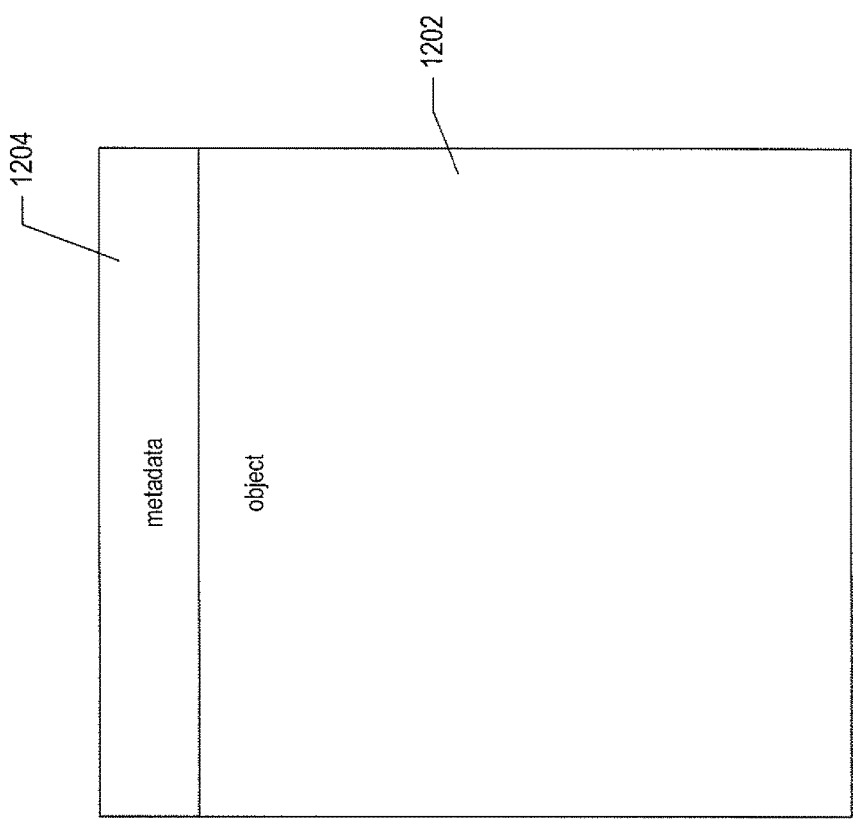
FIG. 12 illustrates the service-provider-identifying metadata disclosed in the current application.
Figure 13:
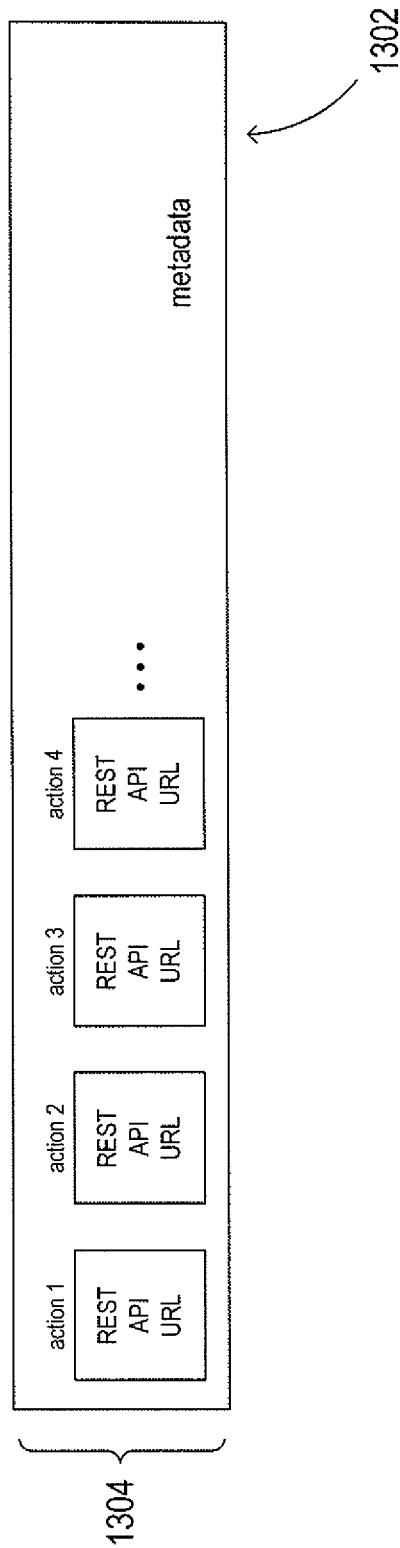
FIG. 13 illustrates the nature of the metadata in one implementation.

FIG. 12 illustrates the service-provider-identifying metadata disclosed in the current application. As shown in FIG. 12, any of various types of objects located within distributed-computing facilities 1202 are associated with, contain, or are otherwise bound to metadata 1204. FIG. 13 illustrates the nature of the metadata in one implementation. As shown in FIG. 13, the metadata 1302 includes a list of action/address pairs, such as the action/address pair 1304. Each action/address pair specifies a type of action or servicer request that may be directed through the distributed-computing facility that contains the object to the object or to a service-providing entity that can operate on the object, as well as an address, such as a representational state transfer ("REST") API URL, that allows a remote computational entity to direct a service request to a computational entity in the distributed-computing facility in which the object is located that can service the request or, in other words, carry out the action or operation.

Figure 14:
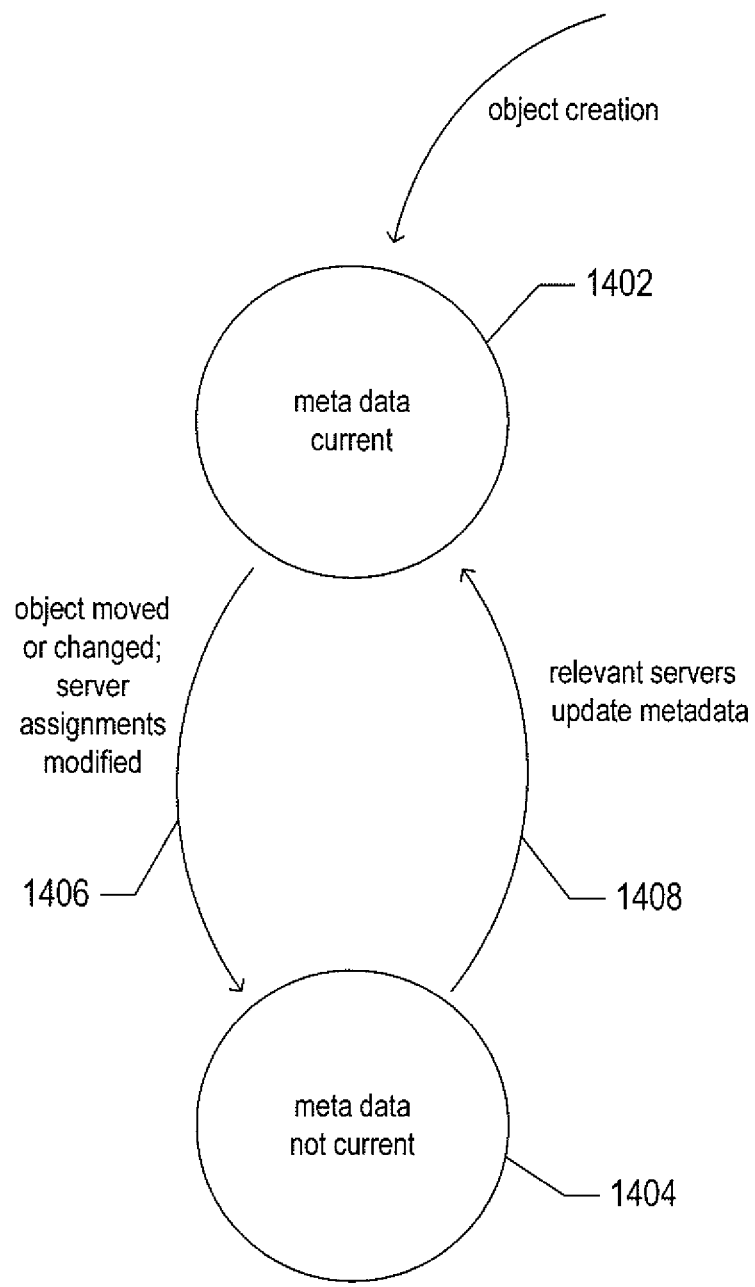
FIG. 14 provides a state-transition diagram for metadata-annotated objects according to the current application.

FIG. 14 provides a state-transition diagram for metadata-annotated objects according to the current application. An object associated with metadata, as discussed above with reference to FIGS. 12 and 13, is either in a metadata-current state 1402 or in a metadata-not-current state 1404. When an object is created, the various types of servers and other computational entities that can service a request for various types of actions directed to the distributed-computing facility with respect to the object are alerted by the distributed computing facility to update the metadata of the object so that the metadata associated with the object is current. Whenever the object is moved or otherwise changed, or when any of the service assignments within the distributed computational facility are changed in a way that may invalidate one or more of the action/address pairs in the metadata, represented by transition 1406, the object enters the metadata-not-current state 1404. This transition results in an additional alert of the relevant service-providing computational entities, such as servers. The object transfers from the metadata-not-current state 1404 back to the metadata-current state 1402 when the relevant servers and other computational entities for each of the different types of services or actions associated with the object update the corresponding metadata within the object, as represented by transition 1408.

By associating metadata with objects, a distributed computing facility can expose, at an object-level granularity, only those configuration and service assignments needed to make the object remotely accessible, when remote access is desirable. Furthermore, the exposed information can only be obtained by remote computation entities with access privilege for the object. Thus, sensitive configuration and service-assignment information is not provided insecurely or at a level that may compromise the distributed computational facility. Furthermore, object-associated metadata allows request handling to be distributed among multiple computational entities within a distributed computational system with respect to objects without the need for complex routing and dispatching of requests for actions or service related to the objects. In certain implementations, the metadata may be self-describing by being encoded in the extended markup language ("XML") or other self-describing encodings.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method that provides for inter-distributed-computing-facility operations, the method comprising:
   in a distributed computing facility, storing metadata within, or storing the metadata together with, an object, stored within the distributed computing facility, with respect to which a request can be directed to the distributed computing facility, the metadata
      identifying a computational entity within the distributed computing facility that can receive and carry out the request, and
      retrieved by accessing the object; and
   alerting computational entities within the distributed computing facility that provide services with respect to the object to update the metadata following metadata-invalidating events, the metadata-invalidating events including
      moving the object from one computational entity to another computational entity within the distributed computing facility;
      altering or updating the object; and
      modifying request-servicing assignments within the distributed computing facility.

2. The method of claim 1 wherein the metadata includes action/identifier pairs that each comprises an indication of a type of action that can be performed on the object or type of service request that can be directed to the object and the address or other identifying information for a computational entity within the distributed computing facility that performs the type of action or type of service request with respect to the object.

3. The method of claim 1 wherein servicing of a type of request with respect to multiple objects is distributed among multiple computational entities within the distributed computing facility.

4. A method by which a computational entity accesses an object or directs a service request with respect to the object to a service-providing computational entity within a remote distributed computing facility, the method comprising:
   accessing the object through an object-access interface provided by the remote distributed computing facility;
   accessing the object to retrieve metadata stored within, or stored together with, the object to identify a computational entity within the remote distributed computing facility that can receive and carry out an object-access request or service request with respect to the object; and
   transmitting the object-access request or the service request to the identified computational entity within the remote distributed computing facility.

5. The method of claim 4 wherein the metadata includes action/identifier pairs that each comprises an indication of a type of action that can be performed on the object or type of service request that can be directed to the object and the address or other identifying information for a computational entity within the remote distributed computing facility that performs the type of action or type of service request with respect to the object.

6. A distributed computing facility comprising:
   two or more computing facilities that each includes multiple server computers, the two or more computing facilities interconnected by one or more communications networks; and
   computer instructions stored within the distributed computing facility that, when executed on processors within the distributed computing facility, control the distributed computing facility to provide remote access to, and request handling for, an object stored within the distributed computing facility by
      storing metadata within, or storing the metadata together with, the object, stored within the distributed computing facility, with respect to which a request can be directed to the distributed computing facility, the metadata
         identifying a computational entity within the distributed computing facility that can receive and carry out the request, and
         retrieved by accessing the object; and
      alerting computational entities within the distributed computing facility that provide services with respect to the object or access to the object to update the metadata following metadata-invalidating events, the metadata-invalidating events including
         moving the object from one computational entity to another computational entity within the distributed computing facility;
         altering or updating the object; and
         modifying request-servicing assignments within the distributed computing facility.

7. The distributed computing facility of claim 6 wherein the metadata includes action/identifier pairs that cach comprises an indication of a type of action that can be performed on the object or type of service request that can be directed to the object and the address or other identifying information for a computational entity within the distributed computing facility that performs the type of action or type of service request with respect to the object.

8. The distributed computing facility of claim 6 wherein servicing of a type of request with respect to multiple objects is distributed among multiple computational entities within the distributed computing facility.

* * * * *